United States Patent
Chou et al.

(10) Patent No.: US 8,570,724 B2
(45) Date of Patent: Oct. 29, 2013

(54) SELF-ADJUSTMENT SUSPENSION APPARATUS AND ELECTRONIC DEVICE WITH SAME

(75) Inventors: Che-Yu Chou, New Taipei (TW); Qun Huang, Shenzhen (CN); Tai-Shan Zhu, Shenzhen (CN); Tao Jiang, Shenzhen (CN); Yue-Ping Liu, Shenzhen (CN); Jun-Liang Zhang, Shenzhen (CN); Jian-Bin Zhou, Shenzhen (CN); Wei-Wei Yu, Shenzhen (CN); Zhi-Jun Shi, Shenzhen (CN); Hai-Qian Ge, Shenzhen (CN); Ya-Ping Gu, Shenzhen (CN); Wen-Chih Lan, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 77 days.

(21) Appl. No.: 13/301,704

(22) Filed: Nov. 21, 2011

(65) Prior Publication Data
US 2012/0248953 A1 Oct. 4, 2012

(30) Foreign Application Priority Data

Mar. 31, 2011 (CN) .......................... 2011 1 0080448

(51) Int. Cl.
*H05K 7/00* (2006.01)
*G09G 5/32* (2006.01)
*B41J 29/02* (2006.01)

(52) U.S. Cl.
USPC ...... 361/679.08; 345/168; 400/691; 400/693; 361/679.2

(58) Field of Classification Search
USPC .............. 400/682, 82, 691–693, 488; 341/22; 345/168
See application file for complete search history.

(56) References Cited

U.S. PATENT DOCUMENTS

| | | | | |
|---|---|---|---|---|
| 6,102,663 | A * | 8/2000 | Wang | 416/244 R |
| 6,872,054 | B2 * | 3/2005 | Pearce | 416/244 R |
| 7,241,060 | B2 * | 7/2007 | Mootz et al. | 396/421 |

* cited by examiner

*Primary Examiner* — Zachary M Pape
*Assistant Examiner* — Douglas Burtner
(74) *Attorney, Agent, or Firm* — Altis & Wispro Law Group, Inc.

(57) ABSTRACT

An exemplary suspension apparatus for suspending built-in equipment is provided. The suspension apparatus includes a fixing plate having a main plate and a recessed portion formed at the main plate, and a rotator rotatably engaged with the fixing plate. The rotator includes an engagement head and a connection pole; the engagement head is received in the recessed portion of the fixing plate, an end of the connection pole is connected to the engagement head, and an opposite end of the connection pole is a suspended end for suspending the built-in equipment.

6 Claims, 8 Drawing Sheets

SELF-ADJUSTMENT SUSPENSION APPARATUS AND ELECTRONIC DEVICE WITH SAME

CROSS-REFERENCE TO RELATED APPLICATION

This application is related to, and claims the benefit of, a foreign priority application filed in China as Serial No. 201110080448.5 on Mar. 31, 2011. The related application is incorporated herein by reference.

BACKGROUND

1. Technical Field

The present disclosure relates to suspension technology, and particularly, to a self-adjustment suspension apparatus for suspending built-in equipment in an electronic device.

2. Description of Related Art

Built-in equipment, such as a built-in projector or a built-in camera, may be installed within an electronic device to provide a supplementary function for the electronic device. For example, a built-in projector may be installed within a monitor or a keyboard used in a meeting room. The projector displays images used in conducting the meeting onto a screen, so that all the attendees can easily view the contents of the images.

To ensure a better projection effect, a projecting axis of the projector needs to have a predetermined angle with respect to the horizontal. However, the built-in projector is normally fixed in the electronic device with screws. Therefore when a position of the electronic device is changed, the projecting axis of the projector may deviate from an original alignment, whereby the angle between the projecting axis and the horizontal changes. This may result in distortion of the projected images.

What is needed is to provide a means that can overcome the above-described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe specific exemplary embodiments of the present disclosure in detail.

The present disclosure provides a suspension apparatus for freely suspending built-in equipment, such as a built-in projector, in an electronic device. The suspension apparatus can effectively ensure that a projection axis of the built-in projector maintains a predetermined angle with respect to the horizontal when a position of the electronic device changes.

To illustrate the suspension apparatus provided in the present disclosure, the following embodiment takes a built-in projector as an example of the built-in equipment.

Figure 1:
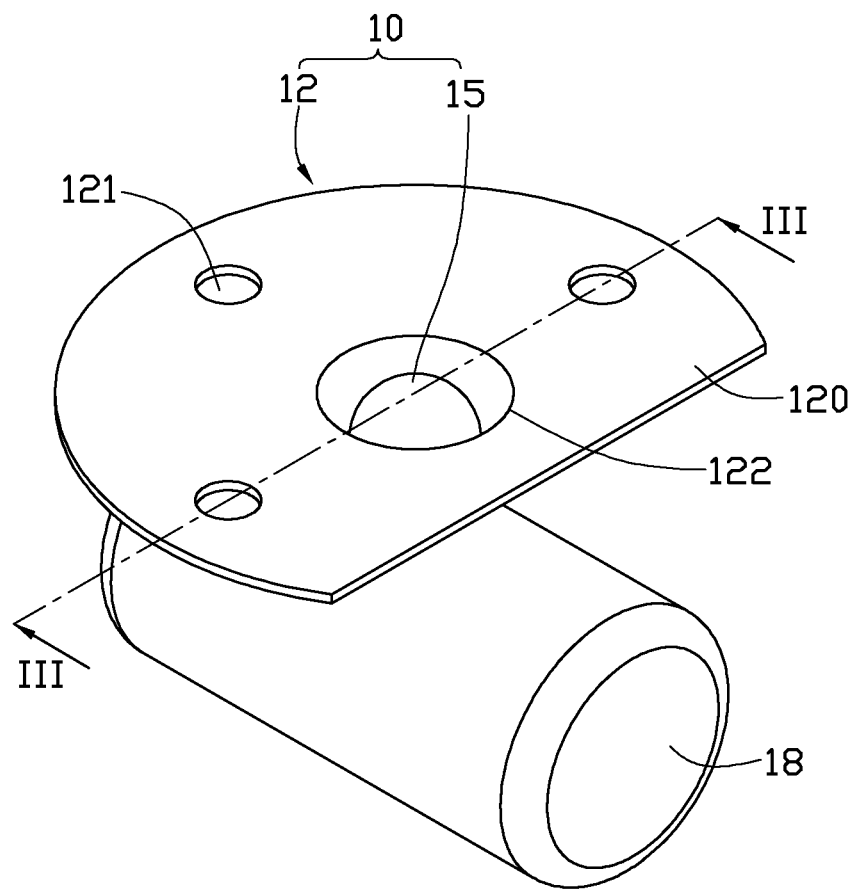
FIG. 1 is an isometric view of a suspension apparatus according to an embodiment of the present disclosure.
Figure 2:
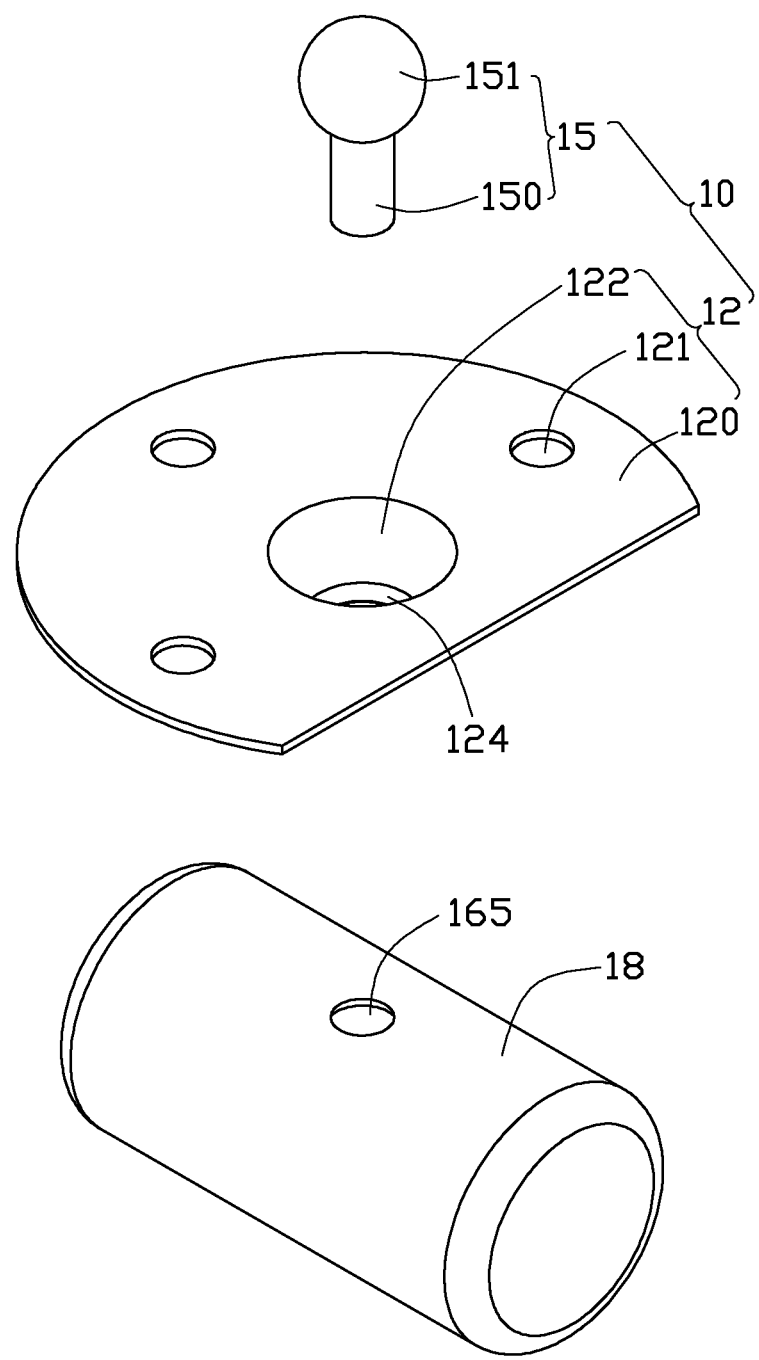
FIG. 2 is an exploded view of the suspension apparatus of FIG. 1.

Referring to FIGS. 1-2, a suspension apparatus 10 for suspending a built-in projector 18 according to an embodiment of the present disclosure includes a fixing plate 12 and a rotator 15. The fixing plate 12 may be fixed to an object member in the electronic device (not shown) in which the built-in projector 18 is located. For example, the fixing plate 12 may be fixed to an inner surface of a frame or a shell of the electronic device. The rotator 15 includes an engagement end for rotatably engaging with the fixing plate 12, and a suspended end for suspending the built-in projector 18. For example, the built-in projector 18 may be fixed to the suspended end of the rotator 15.

In one embodiment, the rotator 15 includes a engagement head 151 and a connection pole 150. The engagement head 151 may have a spherical shape, and the connection pole 150 may have a columnar shape. The engagement head 151 is disposed at the engagement end of the rotator 15. A top end of the connection pole 150 is connected to the engagement head 151, and a bottom end of the connection pole 150 serves as the suspended end of the rotator 15 and is connected to the built-in projector 18. In an alternative embodiment, the engagement head 151 and the connection pole 150 may be integrated in one piece.

The fixing plate 12 includes a main plate 120. A recessed portion 122 is formed at a main central region of the main plate 120. A plurality of mounting holes 121 are defined in the main plate 120, and generally surround the recessed portion 122. The fixing plate 12 may be fixed to the object member by screw bolts that screw through the mounting holes 121, or by other suitable fixing means. The recessed portion 122 provides an engagement space for receiving the engagement head 151 of the rotator 15 in such a manner that the engagement head 151 can move within the engagement space.

Figure 3:
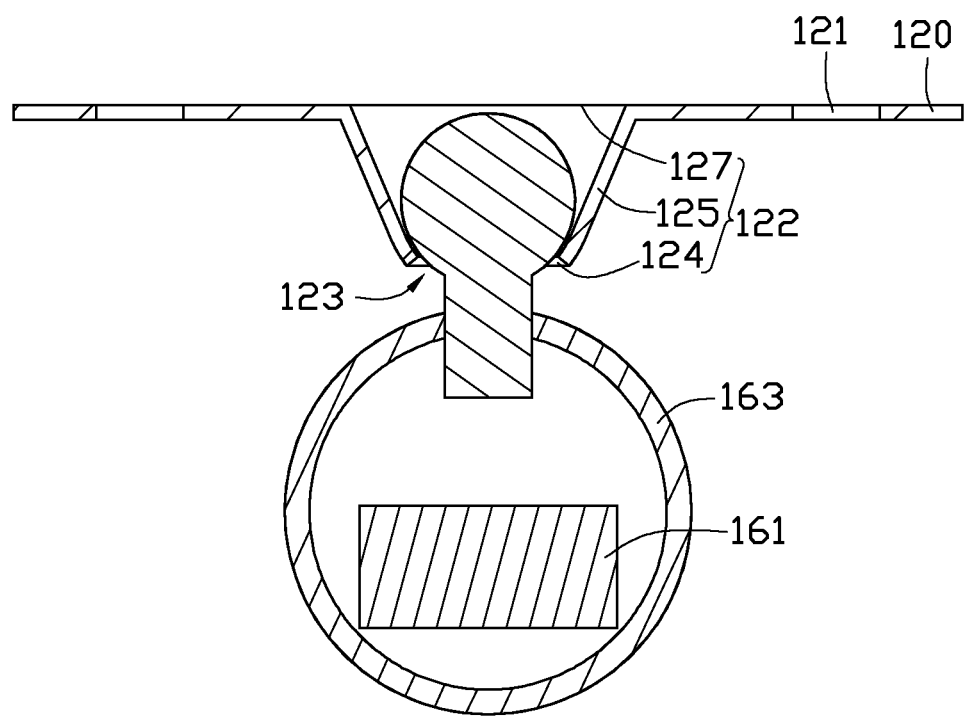
FIG. 3 is a cross-sectional view of the suspension apparatus of FIG. 1, taken along line thereof.

Referring also to FIG. 3, the recessed portion 122 may include an inclined sidewall 125 and a round bottom plate 124. The inclined sidewall 125 may extend downwards from the main plate 120 of the fixing plate 12, and the bottom plate 124 may be parallel to the main plate 120 of the fixing plate 12. The inclined sidewall 125 and the bottom plate 124 thereby cooperatively constitute a hollow truncated cone, which has an upper opening 127 formed at the main plate 120 of the fixing plate 12 and a lower opening 123 formed at the bottom plate 124. The upper opening 127 and the lower opening 123 are both round. A diameter of the upper opening 127 is greater than a diameter of the engagement head 151. A diameter of the lower opening 123 is less than the diameter of the engagement head 151, and is greater than a diameter of a transverse cross section of the connection pole 150. Moreover, a depth of the recessed portion 122 is a little greater than the diameter of the engagement head 151. With this configuration, in assembly, when the rotator 15 is extended into the recessed portion 122 of the fixing plate 12, the connection pole 150 extends through the lower opening 123, and the engagement head 151 is substantial entirely received in the recessed portion 122. In such position, the connection pole 150 can be rotated about a spherical center of the engagement head 151.

Furthermore, the bottom plate 124 has a smooth edge at the lower opening 123, and the inclined sidewall 125 and the engagement head 151 have smooth surfaces in order to enable the engagement head 151 to be freely movable in the recessed portion 122. Thus, the connection pole 150 can be easily rotated about a spherical center of the engagement head 151. In one embodiment, the edge of the bottom plate 124 at the lower opening 123, the inclined sidewall 125, and the engagement head 151 may be coated with lubricant.

The built-in projector 18 may include a shell 163, and an electrical module 161 received in the shell 163 and configured for projecting images. The shell 163 includes a round fixing hole 165, which receives the suspended end of the connection pole 150 in order to fix the built-in projector 18 to the connection pole 150. In one embodiment, a diameter of the fixing hole 165 of the shell 163 is slightly less than the diameter of the cross section of the connection pole 150. In such case, the connection pole 150 is interferentially fixed in the fixing hole 165 of the shell 163, and thereby the built-in projector 18 is fixed to the connection pole 150 tightly.

In a normal suspended state of the suspension apparatus 10, the engagement head 151 is received in the recessed portion 122 and the connection pole 150 is in an upright position. That is, the rotator 15 stands vertically (perpendicular to the ground), and thus the projection axis of the built-in projector 18 has a predetermined angle with respect to the horizontal. When the position of the electronic device in which the suspension apparatus 10 and the built-in projector 18 are located changes, the connection pole 150 may first deviate from the upright position due to the change in position of the electronic device. However, due to gravity acting on the built-in projector 18, the connection pole 150 is then forced to rotate about the engagement head 151 and return to the upright position, such that the projecting axis of the built-in projector 18 automatically returns to the predetermined angle with respect to the horizontal. Therefore distortion of projected images of the built-in projector 18 that might otherwise occur due to displacement of the projecting axis can be prevented, and a projection effect of the built-in projector 18 can be improved.

Figure 4:
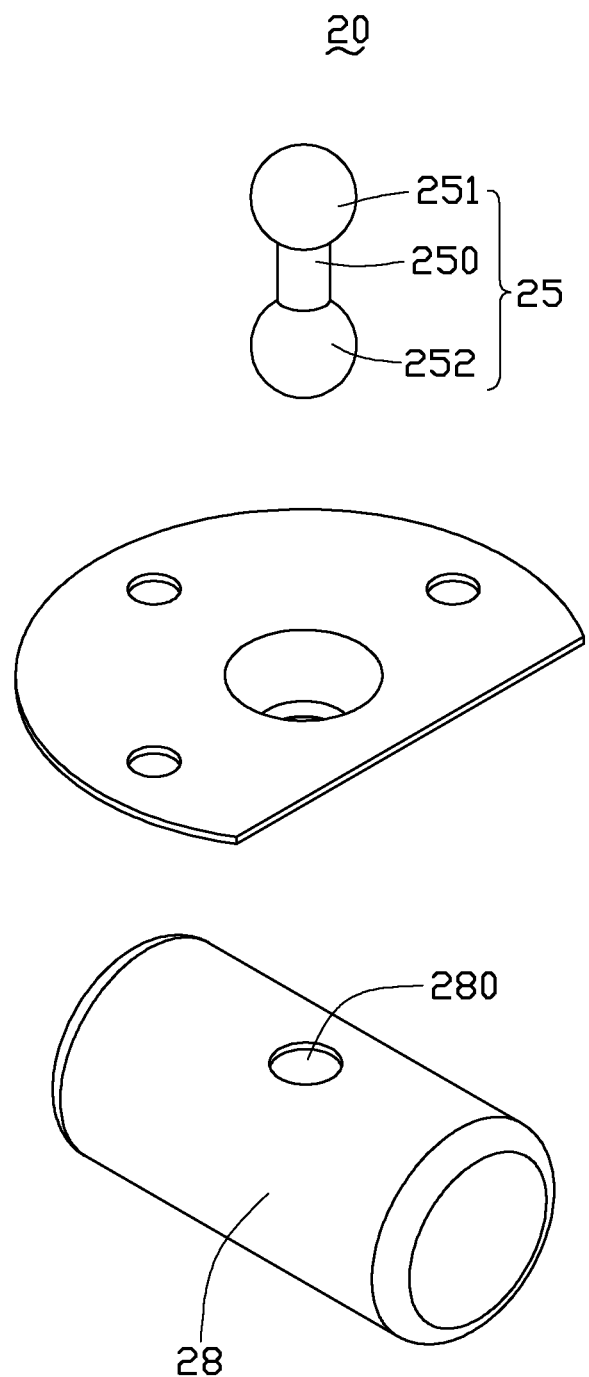
FIG. 4 is an exploded, isometric view of a suspension apparatus according to another embodiment of the present disclosure.
Figure 5:
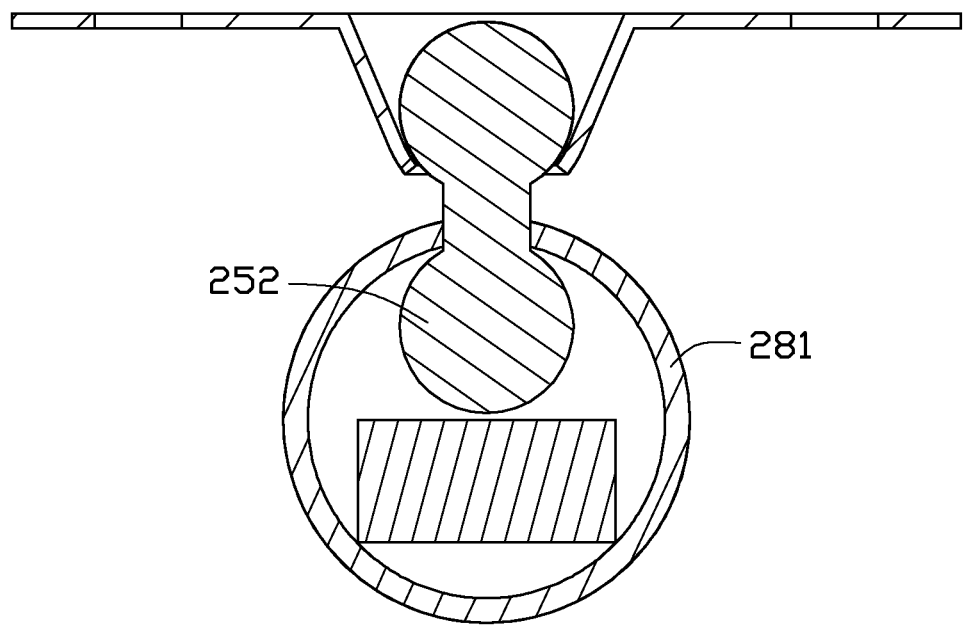
FIG. 5 is a cross-sectional view of the suspension apparatus of FIG. 4 when assembled.

FIGS. 4 and 5 show a suspension apparatus 20 for engaging a built-in projector 28 according to another embodiment of the present disclosure. The suspension apparatus 20 differs from the above-described suspension apparatus 10 in that a rotator 25 has a dumbbell shape. The rotator 25 not only includes a connection pole 250 and an engagement head 251 connected at one end of the connection pole 250, but also includes a fixing nut 252 that is connected at an opposite end of the connection pole 250. The fixing nut 252 may have a same spherical shape and a same size as the engagement head 251. A diameter of the fixing nut 252 is greater than a diameter of a fixing hole 280. The connection pole 250 extends through the round fixing hole 280 defined in a shell 281, and the fixing nut 252 is received in the shell 281 and fixed to the built-in projector 28 at the fixing hole 280.

Figure 6:
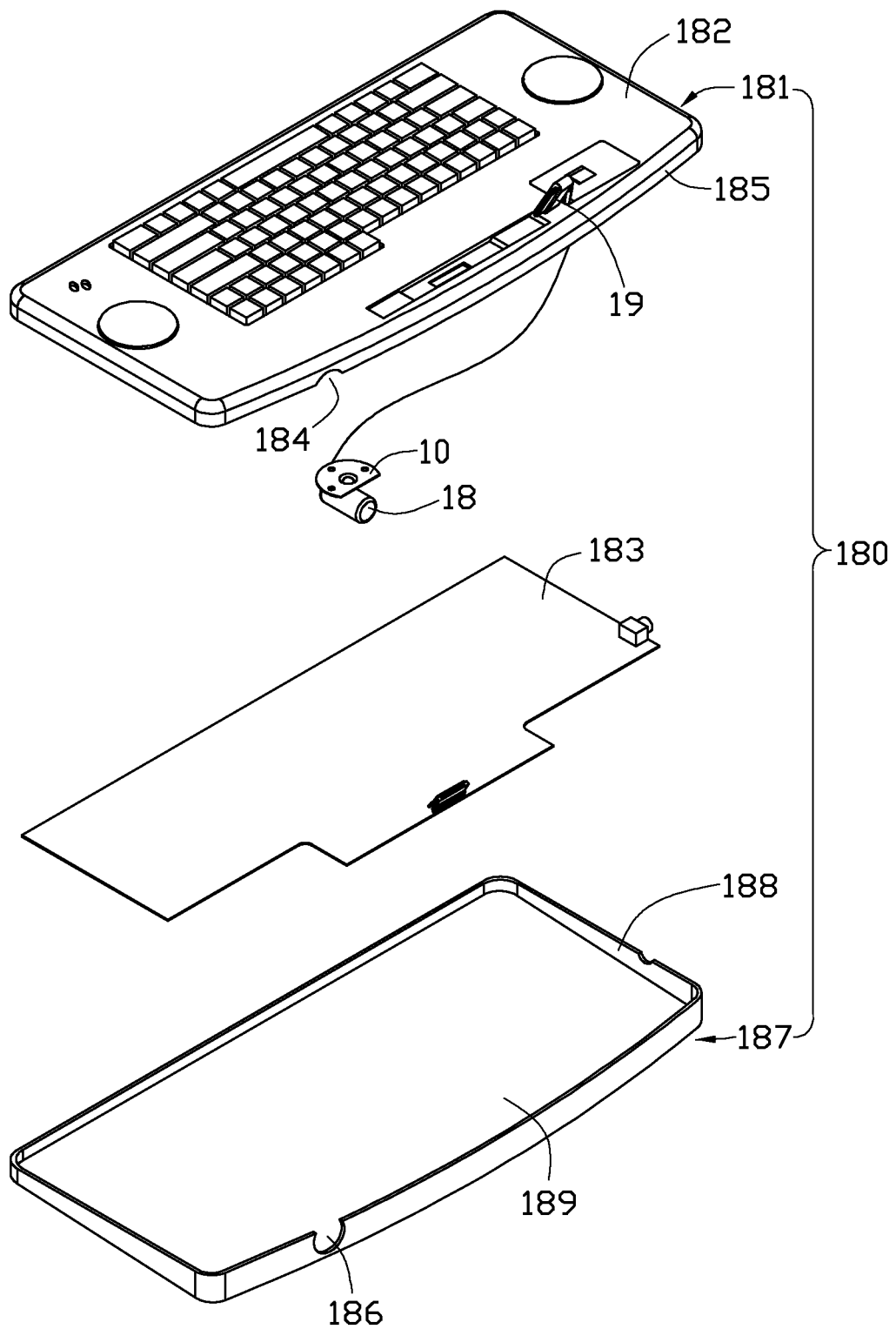
FIG. 6 is an exploded, isometric view of an electronic device including the suspension apparatus of FIG. 1, according to an embodiment of the present disclosure.
Figure 7:
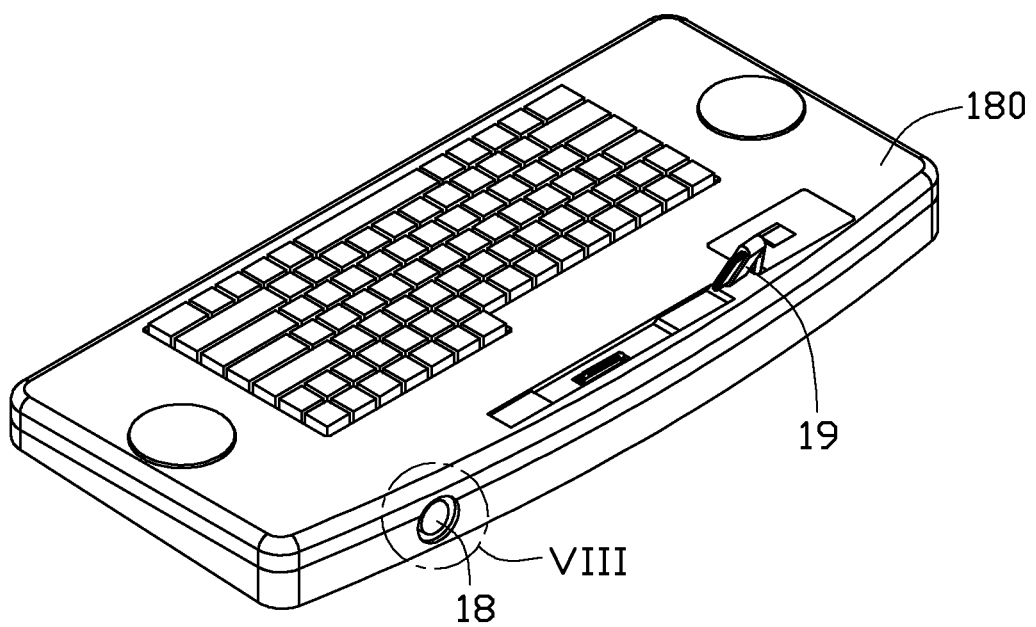
FIG. 7 is an assembled view of the electronic device of FIG. 6.
Figure 8:
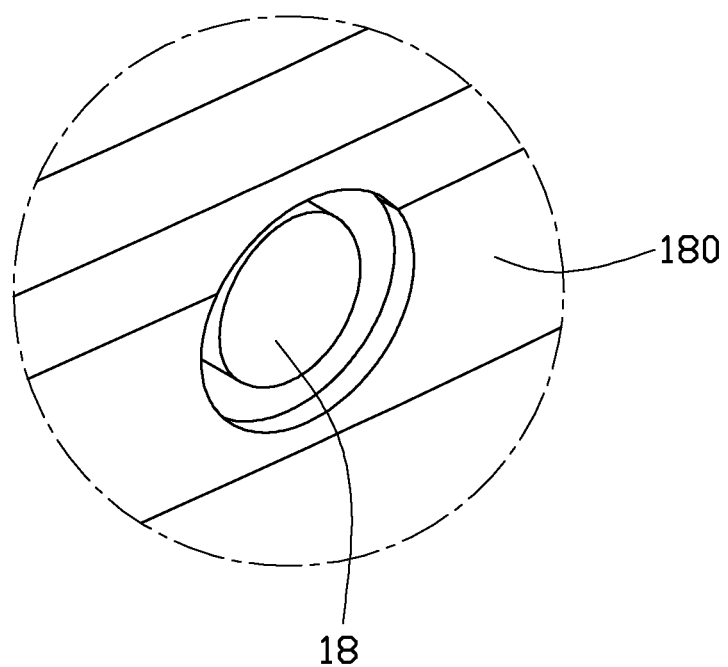
FIG. 8 is an enlarged view of a circled part VIII of the electronic device of FIG. 7.

The suspension apparatus 10, 20 as provided in the above-described embodiments can be employed for suspending a built-in projector 18, 28 in an electronic device such as a keyboard or a monitor. Referring to FIGS. 6-8, a portable keyboard 180 using the suspension apparatus 10 for suspending the built-in projector 18 is taken as an example.

The keyboard 180 includes an upper frame 181, a lower frame 187, and a printed circuit board 183 received in an accommodating space formed when the upper frame 181 is assembled with the lower frame 187. The upper frame 181 includes a top plate 182 for accommodating key buttons thereat, and a plurality of first sidewalls 185 extending downwards from the top plate 182. The lower frame 187 includes a bottom plate 189, and a plurality of second sidewalls 188 extending upwards from the bottom plate 189.

The above-described suspension apparatus 10 may be provided in the keyboard 180. The suspension apparatus 10 includes the fixing plate 12 fixed to an inner surface of the top plate 182, and the rotator 15 rotatably engaged with the fixing plate 12. The built-in projector 18 can be fixed to the suspended end of the rotator 15. Further details of the configuration and operation of the suspension apparatus 10 can be found in the above description.

One of the first sidewalls 185 of the upper frame 181 adjacent to the built-in projector 18 includes a first cutout 184, and a corresponding one of the second sidewalls 188 of the lower frame 187 includes a second cutout 186. The first cutout 184 and the second cutout 186 cooperatively provide a round projection hole, and a light emission area of the built-in projector 18 faces the projection hole, such that images projected by the built-in projector 18 can be displayed on a screen in front of the keyboard 180.

Moreover, the keyboard 180 may also include an interface 19 that is disposed at the top plate 182. The interface 19 may be connected to the built-in projector 18 through a wire. The interface 19 can receive input signals including video signals from an external device such as a mobile phone or a notebook personal computer, and transmit the input signals to the built-in projector 18. As such, images corresponding to the input signals of the external device can be projected onto the screen in front of the keyboard 180 by the built-in projector 18. In other embodiments, the interface 19 may also be connected to the printed circuit board 183, and thus the keyboard 180 can also serve as an input device of the external device. For example, a user may press the key buttons at the upper frame 181 to input various commands to the keyboard 180, whereupon the printed circuit board 183 converts the input commands into electrical signals and transmits the electrical signals to the external device via the interface 19. Therefore, the images projected by the built-in projector 18 can be modified by the user as needed.

The keyboard 180 may further include a built-in speaker that is also connected to the interface 19. In such case, the input signals from the external device may further include audio signals. The built-in speaker can emit the sounds represented by the audio signals, as an accompaniment to the projected images of the built-in projector 18.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising:
   an upper frame;
   a lower frame opposite to the upper frame;
   a suspension apparatus comprising:
   a fixing plate fixed to an inner surface of the upper frame, the fixing plate comprising a recessed portion; and
   a rotator rotatably engaged with the fixing plate, the rotator comprising an engagement head movably received in the recessed portion, and a connection pole with a top end connected to the engagement head; and
   built-in equipment attached to a bottom suspending end of the connection pole of the rotator;
   wherein when an angle of the electronic device with respect to the horizontal changes, an angle of the built-in equipment with respect to the horizontal automatically self-adjusts to an original angle due to gravity acting on the built-in equipment;

wherein the recessed portion of the fixing plate comprises an inclined sidewall extending downwards from the main plate, and a bottom plate connected to the inclined sidewall, the inclined sidewall and the bottom plate cooperative constituting a container for receiving the engagement head, the bottom plate defining an opening, and the connection pole extending through the opening of the bottom plate and rotatable about a center of the engagement head.

2. The electronic device of claim 1, wherein the built-in equipment comprises a shell, the shell comprising a fixing hole for fixing the built-in equipment to the suspending end of the connection pole.

3. The electronic device of claim 2, wherein the fixing hole of the shell has a round shape, a diameter of the fixing hole of the shell is less than a diameter of the suspending end of the connection pole, and the suspending end of the connection pole is interferentially fixed in the fixing hole of the shell whereby the built-in equipment is fixed to the connection pole.

4. An electronic device, comprising:
an upper frame;
a lower frame opposite to the upper frame;
a suspension apparatus comprising:
a fixing plate fixed to an inner surface of the upper frame, the fixing plate comprising a recessed portion; and
a rotator rotatably engaged with the fixing plate, the rotator comprising an engagement head movably received in the recessed portion, and a connection pole with a top end connected to the engagement head; and
built-in equipment attached to a bottom suspending end of the connection pole of the rotator;
wherein when an angle of the electronic device with respect to the horizontal changes, an angle of the built-in equipment with respect to the horizontal automatically self-adjusts to an original angle due to gravity acting on the built-in equipment;
wherein a first cutout is defined at a sidewall of the upper frame, and a second cutout is defined at a corresponding sidewall of the lower frame, the first cutout and the second cutout cooperatively provide a projection hole, the built-in equipment is a built-in projector, and a light emission area of the built-in projector faces the projection hole.

5. The electronic device of claim 4, wherein the electronic device is a portable keyboard, which is configured to serve as an input device of a mobile phone.

6. The electronic device of claim 5, further comprising an interface disposed at a top plate of the upper frame and connected to the built-in projector, wherein the interface is configured to receive an input video signal from the mobile phone and transmit the input video signal to the built-in projector, so as to enable the built-in projector to project images corresponding to the input video signal.

* * * * *